United States Patent
Poupyrev et al.

(10) Patent No.: US 9,501,145 B2
(45) Date of Patent: Nov. 22, 2016

(54) ELECTROVIBRATION FOR TOUCH SURFACES

(75) Inventors: Ivan Poupyrev, Pittsburgh, PA (US); Olivier Bau, Pittsburgh, PA (US); Ali Israr, Monroeville, PA (US); Chris Harrison, Mount Kisco, NY (US)

(73) Assignee: Disney Enterprises, Inc., Burbank, CA (US)

( * ) Notice: Subject to any disclaimer, the term of this patent is extended or adjusted under 35 U.S.C. 154(b) by 1357 days.

(21) Appl. No.: 13/092,572

(22) Filed: Apr. 22, 2011

(65) Prior Publication Data

US 2011/0285667 A1    Nov. 24, 2011

Related U.S. Application Data

(60) Provisional application No. 61/347,068, filed on May 21, 2010, provisional application No. 61/430,125, filed on Jan. 5, 2011.

(51) Int. Cl.
G06F 3/041    (2006.01)
G06F 3/01    (2006.01)
G06F 3/045    (2006.01)

(52) U.S. Cl.
CPC .............. *G06F 3/016* (2013.01); *G06F 3/045* (2013.01)

(58) Field of Classification Search
USPC .......................................................... 345/174
See application file for complete search history.

(56) References Cited

U.S. PATENT DOCUMENTS

| | | | |
|---|---|---|---|
| 5,386,219 A * | 1/1995 | Greanias et al. | 345/174 |
| 8,330,590 B2 * | 12/2012 | Poupyrev et al. | 340/407.2 |
| 2006/0026536 A1 * | 2/2006 | Hotelling et al. | 715/863 |
| 2006/0197592 A1 * | 9/2006 | Chang | 330/86 |
| 2008/0303795 A1 * | 12/2008 | Lowles et al. | 345/173 |
| 2009/0079550 A1 * | 3/2009 | Makinen et al. | 340/407.2 |
| 2009/0109007 A1 | 4/2009 | Makinen et al. | |
| 2010/0085169 A1 | 4/2010 | Poupyrev et al. | |
| 2010/0152794 A1 | 6/2010 | Radivojevic et al. | |
| 2010/0231550 A1 * | 9/2010 | Cruz-Hernandez et al. | 345/174 |
| 2011/0037707 A1 * | 2/2011 | Radivojevic et al. | 345/173 |
| 2011/0079449 A1 * | 4/2011 | Radivojevic | 178/18.03 |
| 2011/0248962 A1 * | 10/2011 | Poupyrev et al. | 345/175 |
| 2011/0279250 A1 * | 11/2011 | Ryhanen et al. | 340/407.2 |
| 2011/0285666 A1 * | 11/2011 | Poupyrev et al. | 345/174 |

FOREIGN PATENT DOCUMENTS

WO    WO 2009141502 A1 * 11/2009

OTHER PUBLICATIONS

Butler et al, (2008). Object appreciation through haptic interaction. In Hello! Where are you in the landscape of educational technology? Proceedings ascilite Melbourne 2008 downloaded from http://www.ascilite.org.au/conferences/melbourne08/procs/butler-m.pdf, pp. 133-141.*

(Continued)

*Primary Examiner* — Dorothy Harris

(74) *Attorney, Agent, or Firm* — Patterson + Sheridan LLP

(57) ABSTRACT

An apparatus that includes a conductive surface and an insulation surface disposed on the conductive surface. The apparatus further includes a controller configured to cause a signal to be coupled to the conductive surface such that a tactile sensation is perceived in a digit that slides on the insulation surface.

27 Claims, 11 Drawing Sheets

(56) References Cited

OTHER PUBLICATIONS

Kaczmarek et al, "Polarity Effect in Electrovibration for Tactile Display", IEEE Transactions on Biomedical Engineering, vol. 53, No. 10, pp. 2047-2054, Oct. 2006.*

Hope et al, "Technology review: The user of electrical impedance scanning in the detection of breast cancer", available on line http://breast-cancer-research.com/content/6/2/69, Published Nov. 13, 2003, pp. 69-74.*

Yang et al, "Simplified Permittivity Measurement of Human Skin in Vivo", 2000 IEEE, pp. 121-122.*

* cited by examiner

ELECTROVIBRATION FOR TOUCH SURFACES

CROSS-REFERENCE TO RELATED APPLICATIONS

This application claims benefit of U.S. provisional patent application Ser. No. 61/347,068, filed on May 21, 2010, and U.S. provisional patent application Ser. No. 61/430,125, filed on Jan. 5, 2011, both of which are hereby incorporated by reference herein.

BACKGROUND

Field of the Invention

Embodiments of the invention relate to touch surfaces, and, in particular, to electrovibration for touch surfaces.

Description of the Related Art

Touch provides humans with a wide variety of sensations that allow us to feel the world. We can enjoy the feeling of textures, as well as objects and materials. Beyond experience, tactile sensations also guide us with everyday tasks and help us to explore object properties that we normally are not able to see.

Interest in designing and investigating haptic interfaces for touch-based interactive systems has been rapidly growing in recent years. Haptics refers to the sense of touch. This interest in haptic interfaces is fueled by the popularity of touch-based interfaces, both in research and end-user communities. However, one major problem with touch interfaces is the lack of dynamic tactile feedback. A lack of haptic feedback decreases the realism of visual environments, breaks the metaphor of direct interaction, and reduces interface efficiency because the user can not rely on familiar haptic cues for accomplishing even the most basic interaction tasks.

In general, adding tactile feedback to touch interfaces has been challenging. In one conventional approach, the touch surface itself can be actuated with various electromechanical actuators, such as piezoelectric bending motors, voice coils, and solenoids. The actuation can be designed to create surface motion either in the normal or lateral directions. Such an approach has been used in the design of tactile feedback for touch interfaces on small handheld devices by mechanically vibrating the entire touch surface. With low frequency vibrations, a simple "click" sensation can be simulated. A major challenge in using mechanical actuation with mobile touch surfaces is the difficulty of creating actuators that fit into mobile devices and produce sufficient force to displace the touch surface. Creating tactile interfaces for large touch screens, such as interactive kiosks and desktop computers, allows for larger actuators. Larger actuated surfaces, however, begin to behave as a flexible membrane instead of a rigid plate. Complex mechanical deformations occur when larger plates are actuated, making it difficult to predictably control tactile sensation or even provide enough power for actuation.

An alternative approach to actuation of the touch surface is to decouple the tactile and visual displays. In the case of mobile devices, tactile feedback can be provided by vibrating the backside of the device, stimulating the holding hand. Alternatively, it is possible to embed localized tactile actuators into the body of a mobile device or into tools used in conjunction with touch interfaces. This approach, however, breaks the metaphor of direct interaction, requires external devices, and still does not solve the problem of developing tactile feedback for large surfaces.

Accordingly, there remains a need in the art for a user interface for a haptic interface that addresses the drawbacks and limitations discussed above.

SUMMARY

Embodiments of the invention provide an interface that allows users to feel a broad range of tactile sensations on touch surfaces. In one embodiment, a touch panel includes a transparent electrode covered by a thin insulation layer. An electrical signal is coupled to the electrode or the back side of the device. When a digit, such as a finger, slides along the insulation layer of the touch panel, a sensation of tactile texture is perceived.

One embodiment provides an apparatus, including: a conductive surface; an insulation surface disposed on the conductive surface; and a controller configured to cause a signal to be coupled to a user in contact with the apparatus such that a tactile sensation is perceived in at least one digit of the user that slides on the insulation surface.

Another embodiment provides a method for generating a signal. The method includes detecting an impedance value of a user in contact with a device relative to a ground; generating a signal based on the impedance value; and causing the signal to be coupled to the user such that a tactile sensation is perceived in at least one digit that slides on an insulation surface of the device.

DETAILED DESCRIPTION OF EXEMPLARY EMBODIMENTS

Figure 1:
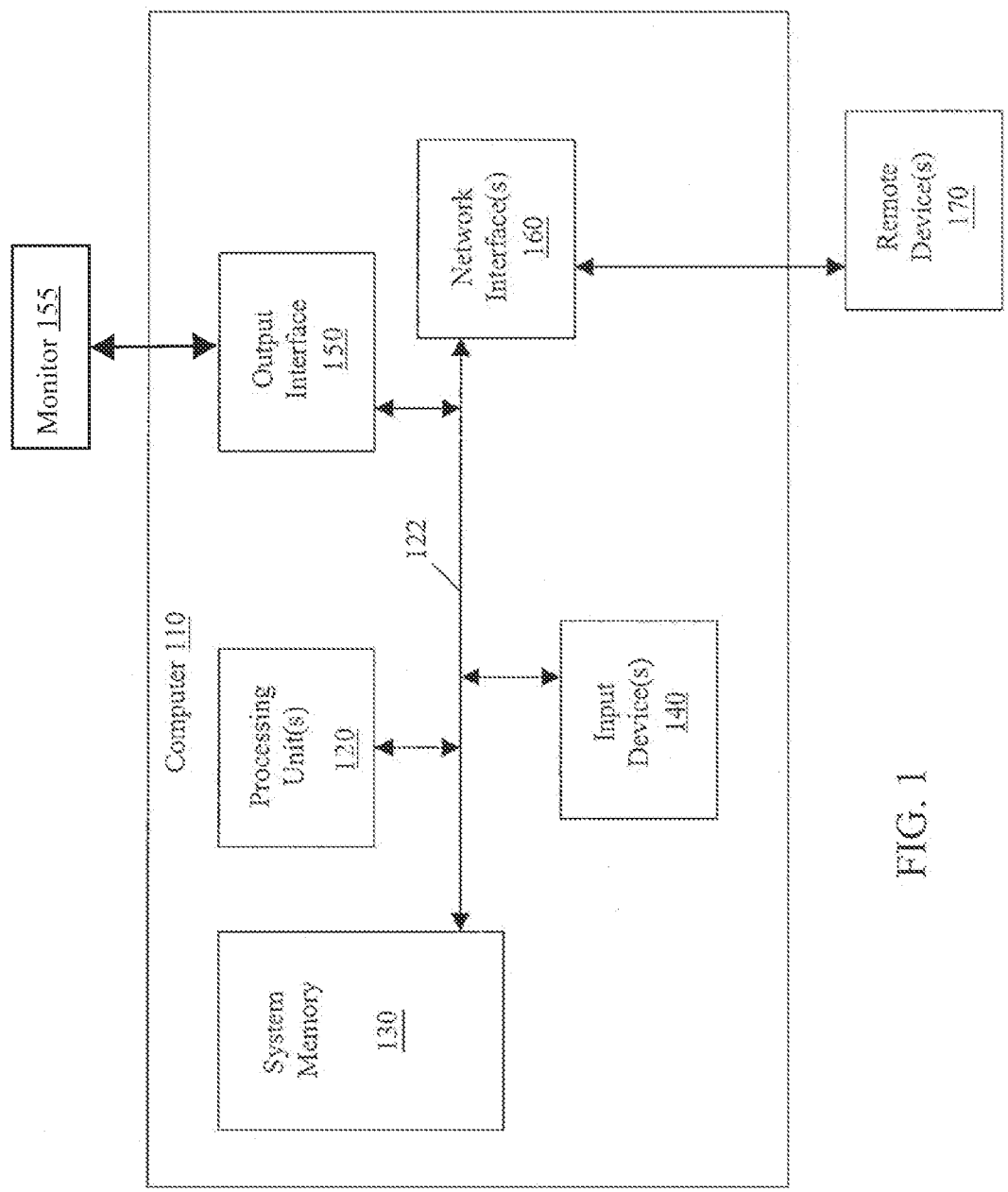
FIG. 1 is a block diagram of a system configured to implement one or more aspects of the invention.

Embodiments of the invention provide an interface that allows users to feel a broad range of tactile sensations on touch screens. Unlike other tactile technologies, embodiments of the invention do not use any mechanical motion. In one embodiment, a touch panel includes a transparent electrode covered by a thin insulation layer. An electrical signal is coupled to the electrode. As described in greater detail below, in another embodiment, a signal can be applied directly to the user via the back side of the device. The signal may be a time-varying signal. In some embodiments, the time-varying signal is periodic. When a finger, or other conductive object such as a pen, slides along the insulation layer of the touch panel, a sensation of tactile texture is perceived.

Embodiments of the invention can be easily combined with different display and input technologies and can be used in many applications. For example, a touch screen can simulate the feeling of various textures. Another example application includes enhancing drawing applications with the feeling of paint on a virtual canvas. Embodiments of the invention can also simulate friction between objects. For example, dragging a virtual car could feel different depending on the type of virtual pavement on which the car is being dragged. In another example, dragging large files using the touch screen could create more friction than compared to dragging smaller files. Similarly, embodiments of the invention allow the user feel constraints, such as snapping to a grid in a manipulation task. There are many more applications of embodiments of the invention. Combined with other input modalities such as video, embodiments of the invention create many new applications and exciting user experiences.

System Overview

Embodiments may be implemented as a system, method, apparatus or computer program product. Accordingly, various embodiments may take the form of an entirely hardware embodiment, an entirely software embodiment (including firmware, resident software, micro-code, etc.) or an embodiment combining software and hardware aspects. Furthermore, embodiments may take the form of a computer program product embodied in one or more computer-readable medium(s) having computer-readable program code embodied therewith.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. A computer-readable storage medium may be any tangible medium that can contain or store a program for use by or in connection with an instruction execution system, apparatus, or device. A computer-readable signal medium may include a propagated data signal with computer-readable program code embodied therein. Computer program code for carrying out operations of various embodiments may be written in any combination of one or more programming languages (including an object oriented programming language such as Java™, Smalltalk, C++ or the like and conventional procedural programming languages, such as the "C" programming language or similar programming languages). The program code may execute entirely on the user's computer (device), partly on the user's computer, as a stand-alone software package, partly on the user's computer and partly on a remote computer or entirely on the remote computer or server. The remote computer may be connected to the user's computer through any type of network, including a local area network (LAN) or a wide area network (WAN), or the connection may be made to an external computer.

It will be understood that certain embodiments can be implemented by a device such as a computer executing a program of instructions. These computer program instructions may be provided to a processor of a special purpose computer, or other programmable data processing apparatus to produce a machine, such that the instructions, which execute via the processor of the computer or other programmable data processing apparatus, implement the functions/acts specified.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified.

The computer program instructions may also be loaded onto a computer, other programmable data processing apparatus or the like to produce a computer implemented process such that the instructions that execute on the computer or other programmable apparatus provide processes for implementing the functions/acts specified.

FIG. 1 is a block diagram of a system configured to implement one or more aspects of the invention. An example device that may be used in connection with one or more embodiments includes a computing device in the form of a computer 110. Components of computer 110 may include, but are not limited to, a processing unit 120, a system memory 130, and a system bus 122 that couples various system components including the system memory 130 to the processing unit 120. Computer 110 may include or have access to a variety of computer-readable media. The system memory 130 may include computer-readable storage media, for example in the form of volatile and/or nonvolatile memory such as read only memory (ROM) and/or random access memory (RAM). By way of example, and not limitation, system memory 130 may also include an operating system, application programs, other program modules, and program data.

A user can interface with (for example, enter commands and information) the computer 110 through input devices 140. A monitor 155 or other type of display surface can also be connected to the system bus 122 via an interface, such as an output interface 150. In addition to a monitor 155, computers may also include other peripheral output devices. The computer 110 may operate in a networked or distributed environment using logical connections to one or more other remote device(s) 170 such as other computers. The logical connections may include network interface(s) 160 to a network, such as a local area network (LAN), a wide area network (WAN), and/or a global computer network, but may also include other networks/buses.

Certain embodiments are directed to systems and associated methods for creating tactile interfaces for touch surfaces that do not use any form of mechanical actuation. Instead, certain embodiments exploit the principle of "electrovibration," which allows creation of a broad range of tactile sensations by controlling electrostatic friction between an instrumented touch surface and a user's fingers. When combined with an input-capable interactive display, embodiments enable the creation of a wide variety of interactions augmented with tactile feedback. Various example embodiments are described in further detail below. The details regarding the example embodiments provided below are not intended to be limiting, but are merely illustrative of example embodiments.

Electrovibration for Touch Surfaces

Embodiments of the invention provide mechanisms for creating tactile interfaces for touch surfaces that does not use any form of mechanical actuation. Instead, the proposed technique exploits the principle of electrovibration, which allows embodiments to create a broad range of tactile sensations by controlling electrostatic friction between an instrumented touch surface and the user's finger or fingers. When combined with an input-capable interactive display, embodiments of the invention enable a wide variety of interactions augmented with tactile feedback.

Figure 2A:
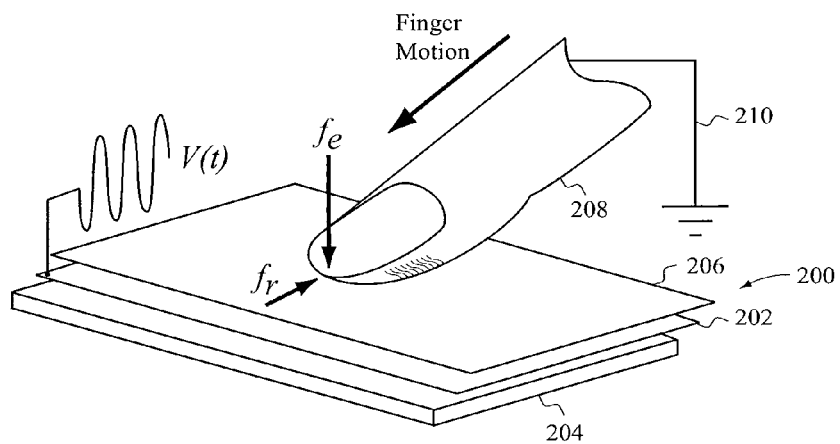
FIGS. 2A-2B are conceptual diagrams of touch surfaces configured for providing electrovibration, according embodiments of the invention.

FIG. 2A is a conceptual diagram of a touch surface 200 configured for providing electrovibration, according one embodiment of the invention. The touch surface 200 includes a transparent electrode sheet 202 applied onto a glass plate 204 coated with an insulator layer 206. A controller causes the transparent electrode 202 to be excited with a periodic electrical signal V(t) coupled to connectors. For example, the connectors could normally be used by a position sensing driver (not shown) of the touch surface 200. When an input signal of sufficient amplitude is provided, an electrically induced attractive force $f_e$ develops between a sliding finger 208 and the underlying electrode 202, increasing the dynamic friction $f_r$ between the finger 208 and the touch surface 200. Because the amplitude of $f_e$ varies with the signal amplitude, changes in friction $f_r$ are also periodic, resulting in periodic skin deformations as the finger 208 slides on the touch surface 200. These deformations are perceived as vibration or friction and can be controlled by modulating the amplitude and frequency of the applied signal. Also, the input signal V(t) is uniformly propagated across the transparent electrode 202; therefore, the resulting tactile sensation is spatially uniform.

In one embodiment, the electrical signal V(t) comprises a sinusoidal waveform. In other embodiments, the electrical signal V(t) comprises other waveforms, including square or triangular waveforms. In some embodiments, the signal can be mono-phasic or bi-phasic. In some embodiments, the signal is rectified. In some embodiments, the signal includes a DC (direct current) offset. In some embodiments, coupling the electrical signal V(t) to the electrode 202 comprises providing the signal directly to the electrode 202. In other embodiment, coupling the electrical signal V(t) to the electrode 202 comprises inductively coupling the electrical signal V(t) to the electrode 202 via capacitive, resistive, and/or inductive elements.

As shown, the user's finger can be connected to a ground 210. In one embodiment, the user can be placed at a potential difference from the electrode. Although our bodies provide a natural link to the ground, creating a direct ground connection can increase the intensity of the tactile sensation. Without such grounding, the voltage could be increased to provide the same intensity of sensation. Grounding can be achieved by wearing a simple ground electrode. For example, the user can wear an anti-static wristband. Users can also sit or stand on a grounded pad. In the case of mobile devices, the backside of the enclosure, which contacts the user when the mobile device is grasped, could be used as the ground. In other embodiments, the ground electrode comprises a grounded pad on which a user is standing, sitting, holding, resting on lap, wearing, touching, or otherwise coupled to the user including via intermediate objects and materials.

In yet another embodiment, a ground plane (not shown) can be included in the touch surface 200. The ground plane can comprise a mesh or include a pattern of holes. When the user touches a finger to the touch surface, the user is effectively grounded by the ground plane. The signal, in this embodiment, is applied to the user.

In yet another embodiment, the electrode layer itself can include both grounding and signal elements. Accordingly, part of the touching finger would be connected to the ground and part to the signal, hence the ground connection is occurring on the finger.

Figure 2B:
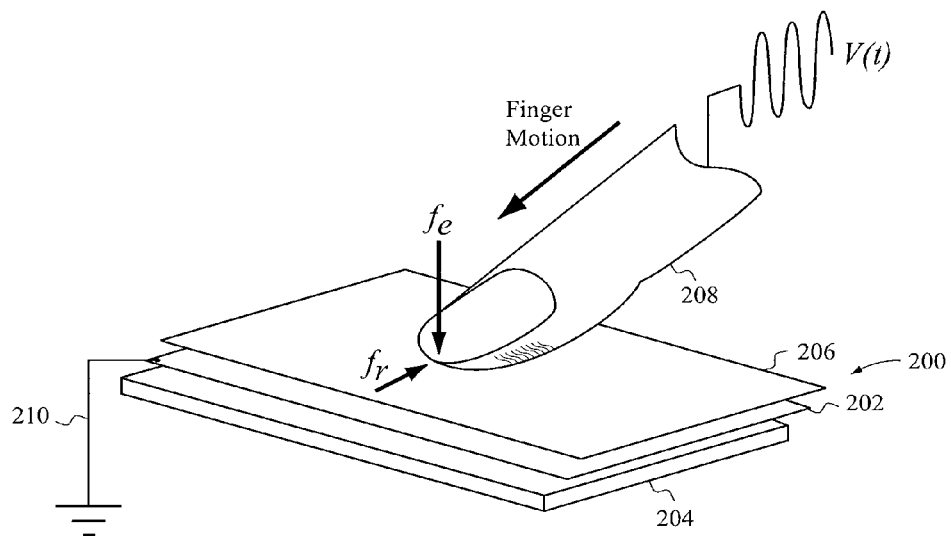

FIG. 2B is a conceptual diagram of a touch surface 200 configured for providing electrovibration, according one embodiment of the invention. As shown, the electrical signal V(t) can be applied to the finger 208 and a path to ground 210 is provided to the electrode 202. In some embodiments, the electrical signal can be applied to the back side of the apparatus and pass through the user's body to the finger 208. A tactile sensation is also perceived in the finger when the finger 208 slides on the insulation layer in the configuration shown in FIG. 2B.

According to various embodiments, the insulator layer 206 can be made of different materials and can have different textures, i.e. a different finish. The electrode 202 can also be made of different materials, including ITO (Indium tin oxide), silver, conductive rubber, copper, aluminum, conductive ink, conductive glue, conductive paint or any other conductive material.

In some cases, the critical factor for safe operation of electrical devices is current, rather than voltage. According to embodiments of the invention, induced charge in the finger causes a force on the finger, and the amount of induced current flowing through the user's hand is negligible. For example, the current supplied to the touch surface 200 can be limited to 0.5 mA, which is typically considered safe for humans. In some embodiment, current limitation is defined by the power rating of an operational amplifier used in the driving circuit. In fact, users experience the same amount of current while using conventional capacitive touch panels. To further protect the user, some embodiments can implement a current limiting circuit.

"Electrovibration" tactile actuation differs from "electrocutaneous" and "electrostatic" tactile actuation. Electrocutaneous displays stimulate tactile receptors in human fingers with electric charge passing through the skin. In contrast, there is no passing charge in electrovibration: the charge in the finger is induced by a charge moving on a conductive surface. Furthermore, unlike electrocutaneous tactile feedback, where current is directly stimulating the nerve endings, stimulation with electrovibration is mechanical, created by a periodic electrostatic force deforming the skin of the sliding finger.

In the electrostatic approach, a user is manipulating an intermediate object, such as a piece of aluminum foil, over an electrode pattern. A periodic signal applied to this pattern creates weak electrostatic attraction between an object and an electrode, which is perceived as vibration when the object is moved by the user's finger. The tactile sensation, therefore, is created indirectly: the vibration induced by electrostatic force on an object is transferred to the touching human finger. In case of electrovibration, no intermediate elements are required; the tactile sensation is created by directly actuating the fingers.

Tactile feedback based on electrovibration has several compelling advantages. Embodiments of the invention provide a mechanism that is fast, low-powered, dynamic, and can be used in a wide range of interaction scenarios and applications, including multi-touch interfaces. Embodiments of the invention demonstrate a broad bandwidth and uniformity of response across a wide range of frequencies and amplitudes. Furthermore, the technology is highly scalable and can be used efficiently on touch surfaces of any size, shape, and/or configuration, including large interactive tables, hand-held mobile devices, as well as curved, flexible, and/or irregular touch surfaces. Lastly, because embodiments of the invention do not have any moving parts, they can be easily implemented in existing devices with minimal physical modification to the devices.

One implementation of an electrovibration touch surface includes implementing a multi-touch interactive tabletop, a wall mounted surface, or any other technically feasible configuration. A touch panel in accordance with FIGS. 2A-2B can be used as a projection and input surface. An additional diffuser plane can be installed behind the panel. A projector can be used to render graphical content. To capture the user input, the panel can be illuminated from behind with infrared illuminators. An infrared camera captures reflections of user fingers touching the surface. For example, the multi-touch tracking can be performed at 60 frames per second. Finger positions are transmitted to a hardware mechanism and/or software application responsible for controlling interactive features, visual display, and tactile output. This implementation is scalable and can be adapted to other input techniques, including frustrated internal reflection and surface acoustic tracking, among others. It can be easily extended, modified and applied to any surface or device. Indeed, since there is no mechanical motion, almost any object can be instrumented with electrovibration-based tactile feedback. The electrodes can be transparent or opaque, be painted on curved and irregular surfaces, and added to any display, hand tool, or appliance. In other embodiments, other sensing technologies can be used in combination with the electrovibration techniques described herein, such as distance tracking, pressure input, contact area tracking, among others.

Figure 3A:
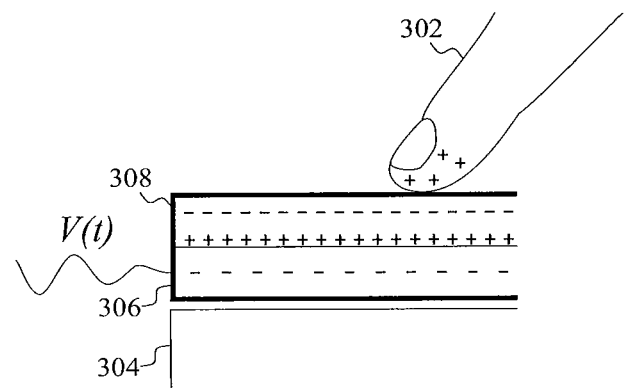
FIGS. 3A-3C illustrate electrical charges corresponding to electrovibration actuation, according to embodiments of the invention.
Figure 3B:
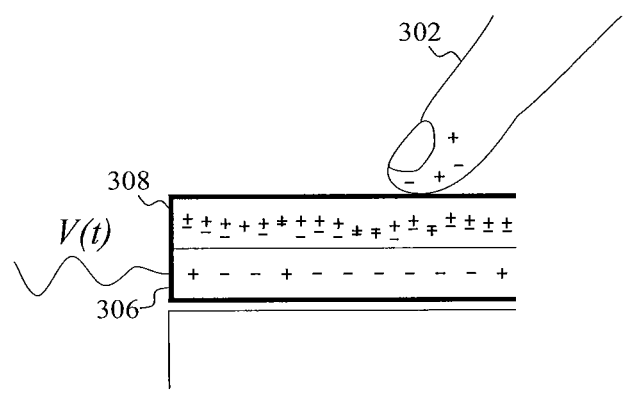
Figure 3C:
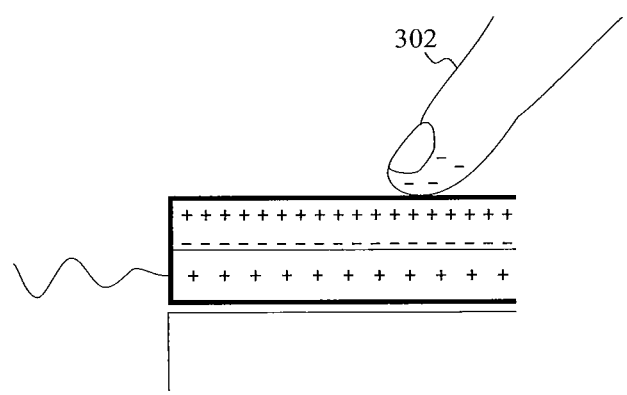

FIGS. 3A-3C illustrate electrical charges corresponding to electrovibration actuation, according to embodiments of the invention. As shown in FIG. 3A, a touch surface comprises a glass plate 304, an electrode 306, and an insulation layer 308. An input signal V(t) is applied to the electrode 306. The input signal V(t) can oscillate and cause positive and negative charges to alternate within the electrode. At the time shown in FIG. 3A, the charges in the electrode are negative. Negative charges in the electrode 306 cause positive charges to accumulate along the bottom portion of the insulation layer 308 and negative charges to accumulate along the top portion of the insulation layer 308. This causes positive charges to be induced in the user's finger 302 when placed in contact with the insulation layer 308.

As described, as the input signal V(t) oscillates, so do the charges in electrode 306. This causes the charges in the insulation layer 308 to "flip-flop" within the insulation layer 308. As shown in FIG. 3B, the positive charges within the insulation layer 308 are moving upwards (i.e., towards the user's finger 302), and the negative charges within the insulation layer 308 are moving downwards (i.e., towards the electrode 306). FIG. 3B also illustrates that some of the charges in the electrode 306 are now positive. The positive charges within the insulation layer 308 continue moving upwards, and the negative charges within the insulation layer 308 continue moving downwards. Negative charges have also started to accumulate within the user's finger tip.

FIG. 3C illustrates the changes within the touch surface at yet another point in time. As shown, the charges in the electrode 306 are now positive. Positive charges in the electrode 306 cause negative charges to accumulate along the bottom portion of the insulation layer 308 and positive charges to accumulate along the top portion of the insulation layer 308. This causes negative charges to accumulate in the user's finger 302 when placed in contact with the insulation layer 308.

As described, a input signal V(t) applied to the electrode 306 displaces charges within the insulation layer 308, creating an oscillating electric field. When the finger 302 is placed on the surface of the touch panel, a periodic motion of electrical charges is induced in the tip of the finger 302. As described above, in other embodiments, the electrical signal V(t) can be applied to the finger 302 and a path to ground is provided to the electrode 306.

Figure 4A:
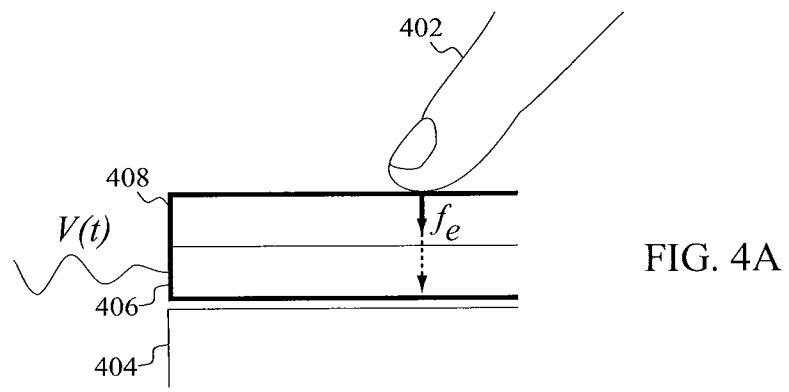
FIG. 4A illustrates an attractive force induced between a finger and a touch surface, according to one embodiment of the invention.

FIG. 4A illustrates an attractive force $f_e$ induced between a finger 402 and a touch surface, according to one embodiment of the invention. The touch surface comprises a glass plate 404, an electrode 406, and an insulation layer 408. An input signal V(t) is applied to the electrode 406. When an input signal V(t) of sufficient amplitude is provided, the electrically induced attractive force $f_e$ develops between the finger 402 and the underlying electrode 406. The induced attractive force $f_e$ oscillates between a stronger force and a weaker force as the charges oscillate within the finger 402. The oscillation of the magnitude of the induced attractive force $f_e$ is illustrated in the FIG. 4A with the dotted arrow representing the induced attractive force $f_e$.

Figure 4B:
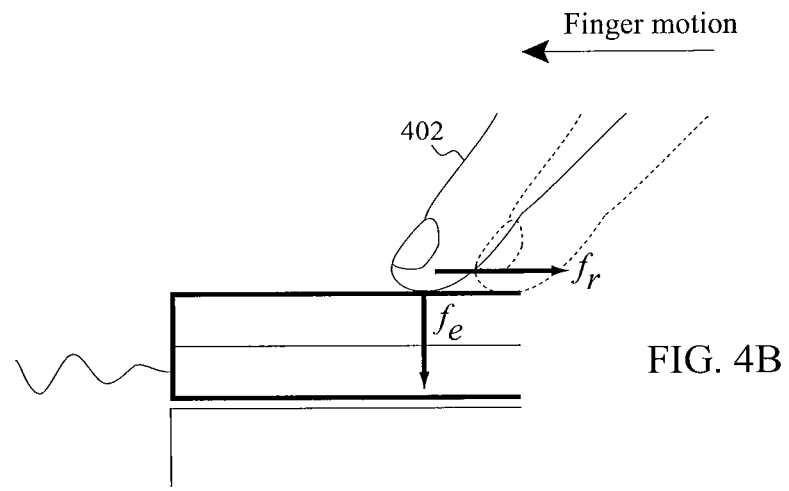
FIGS. 4B-4C illustrate an attractive force induced between a finger and a touch surface and a friction force between the sliding finger and the touch surface, according to embodiments of the invention.
Figure 4C:
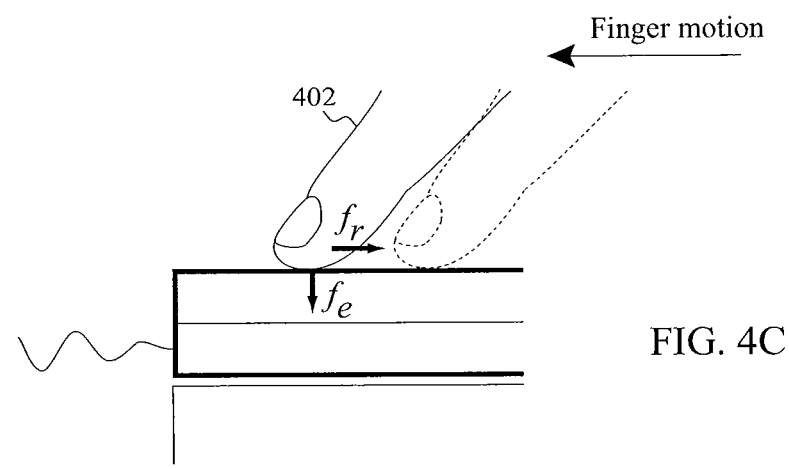

FIGS. 4B-4C illustrate an attractive three $f_e$ induced between a finger 402 and a touch surface and a friction force $f_r$ between the sliding finger 402 and the touch surface as the finger 402 slides in the direction of the finger motion, according to embodiments of the invention. Because the amplitude of $f_e$ varies with the signal amplitude, changes in friction $f_r$ are also periodic, resulting in periodic skin deformations as the finger 208 slides on the touch surface 200. These deformations are perceived as vibration or friction and can be controlled by modulating the amplitude and frequency of the applied signal.

FIGS. 4B-4C illustrate the finger 402 sliding along the touch surface. As shown, the magnitude of the attractive force $f_e$ and the friction force $f_r$ shown in FIG. 4B (i.e., at one finger position) is greater than the magnitude of the attractive force $f_e$ and the friction force $f_r$ shown in FIG. 4C (i.e., at another finger position). In some embodiments, these changes in the magnitude of the friction force $f_r$ are periodic as the user slides the finger 402 along the touch surface, resulting in periodic skin deformations that are perceived as texture.

Figure 5A:
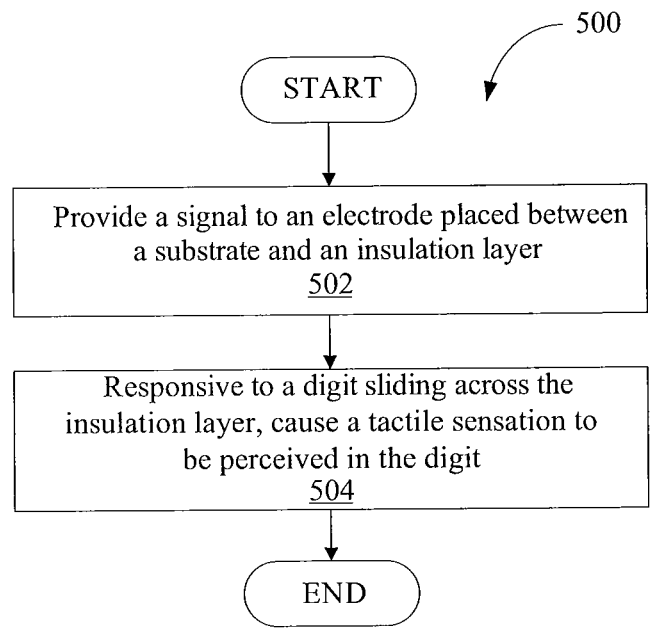
FIGS. 5A-5B are flow diagrams of method steps for providing electrovibration actuation, according embodiments of the invention.

FIG. 5A is a flow diagram of method steps for providing electrovibration actuation, according to one embodiment of the invention. Persons skilled in the art would understand that, even though the method 500 is described in conjunction with the systems of FIGS. 1-4C, any system configured to perform the method steps, in any order, is within the scope of embodiments of the invention.

As shown, the method 500 begins at step 502, where a signal is provided to an electrode placed between a substrate and an insulation layer. In one embodiment, the substrate is a glass plate. In some embodiments, the electrode and/or the insulation surface is transparent and forms part of a touch screen surface. The signal provided to the electrode comprises a periodic, modulated, and/or complex waveform. According to various embodiments, the insulation layer can be made of different materials and can have different textures, i.e. a different finish. The electrode and/or the insulation surface can be made of different materials, including ITO (Indium tin oxide), conductive rubber, copper, silver, aluminum, conductive ink, conductive glue, or any other conductive material.

At step 504, responsive to a digit sliding along the insulation layer, a tactile sensation is perceived by the digit. In some embodiments, the digit comprises a finger. As described, changes in the magnitude of a friction force $f_r$ between the digit and the insulation layer can be periodic as the user slides the digit along the touch surface, resulting in periodic skin deformations that are perceived as texture.

Figure 5B:
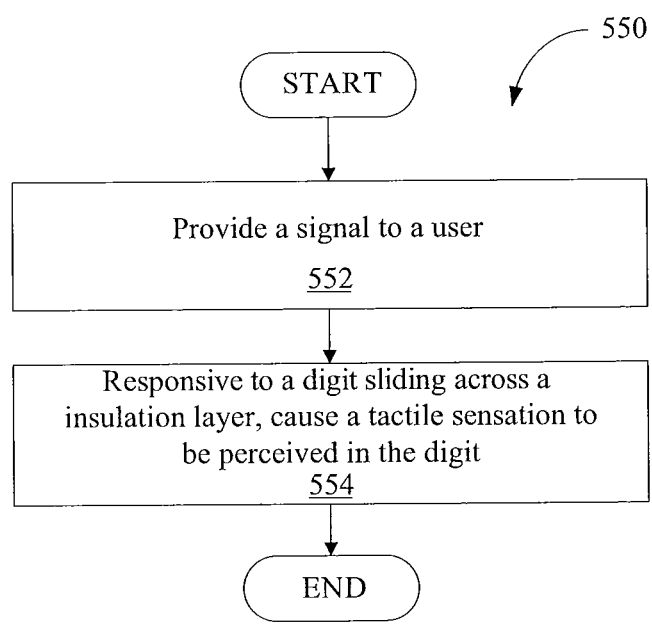

FIG. 5B is a flow diagram of method steps for providing electrovibration actuation, according to one embodiment of the invention. Persons skilled in the art would understand that, even though the method 550 is described in conjunction with the systems of FIGS. 1-4C, any system configured to perform the method steps, in any order, is within the scope of embodiments of the invention.

As shown, the method 550 begins at step 552, where a signal is provided to a user of a device that includes a touch surface. The signal can be generated by a controller included within the device. In one example, the signal is coupled to the back side of the device, which includes a metal surface. Coupling the signal to the back side of the device can include providing the signal directly to the back surface, inductively coupling the signal to the back surface, or any other technique for coupling a signal to a surface. For example, the user that is holding the device can receive the signal through the user's hand.

At step 554, responsive to a digit sliding along an insulation layer of the device, a tactile sensation is perceived by the digit. As described herein, the device can include an electrode placed between a substrate and an insulation layer. In one embodiment, the substrate is a glass plate. In some embodiments, the electrode and/or the insulation surface are transparent and form part of a touch screen surface. In some embodiments, the digit comprises a finger.

In some embodiments, the method 550 described in FIG. 5B corresponds to the arrangement shown in FIG. 2B, where the signal is applied to the user and the electrode is connected to a path to ground. As described, changes in the magnitude of a friction force $f_r$ between the digit and the insulation layer can be periodic as the user slides the digit along the touch surface, resulting in periodic skin deformations that are perceived as texture.

Perception-Based Characteristics of Electrovibration

As described above, varying the frequency, amplitude, DC offset, and/or any other properties of the input signal to the electrode causes the user to feel different tactile feedback. The tactile feedback perceived by a particular individual may be different than the sensation perceived by another individual.

In some embodiments, there is a baseline of human sensitivity that defines an absolute detection threshold and frequency and amplitude discrimination thresholds. In the case of electrovibration, the absolute detection threshold is the minimum voltage amplitude that creates a barely detectable sensation at a specific frequency. Voltages below the detection threshold are not usable in creating haptic sensations. In some embodiments, the frequency of the input signal affects the absolute detection threshold.

Figure 6:
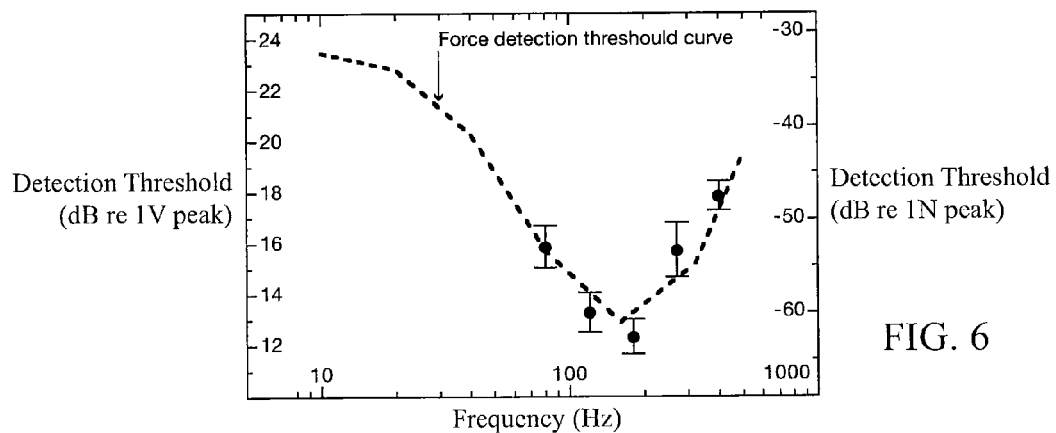
FIG. 6 is a graph of absolute detection thresholds for different frequencies of an input signal, according to some embodiments of the invention.

FIG. 6 is a graph of absolute detection thresholds for different frequencies of an input signal, according to some embodiments of the invention. The data shown in FIG. 6 is based on a user survey and is not meant to be limiting. The data shown in FIG. 6 merely shows one example of absolute detection thresholds for different frequencies.

The absolute detection thresholds for five reference frequencies are shown in FIG. 6. The mean detection thresholds of electrovibrations with standard error bars are shown on the left axis and a force detection threshold curve is shown with units along the right axis. The thresholds are defined in "dB re 1 V peak" units computed as $20 \log_{10}(A)$ where A is the signal amplitude in Volts. Using this unit is a standard practice in psychophysical experiments due to linearity of human perception in logarithmic scale. For comparison, a force detection threshold curve is also plotted in FIG. 6. In this example, there was a statistically significant effect of frequency on the threshold levels ($F(4,36)=12.8$; $p<0.001$), indicating that the threshold levels depend on the stimulus frequency.

The amplitude and frequency discrimination thresholds are typically referred to as just-noticeable-differences (JNDs), which are the smallest detectable differences between two stimuli. The detection and discrimination thresholds together form a set of fundamental measures that describe the dynamic range and processing capabilities of electrovibration sensations. These measures can be used to design interfaces and applications using embodiments of the invention.

In some embodiments, the detection threshold levels for electrovibrations closely coincide with the force detection threshold levels for sinusoidal stimulus. Experiments have shown that sensations created with embodiments of the invention are closely related to perception of forces lateral to the skin. The relation between electrovibration voltages and perceived forces may not be linear.

In some embodiments, the detection threshold levels provide guidelines for designing tactile interfaces using electrovibration. For example, the detection threshold levels inform the designer that at each frequency the applied voltage must be above the corresponding detection threshold level in order to provide a tactile sensation that a user can perceive. They also allow optimizing power requirements. For example, at 400 Hz the tactile signal could create an easily discernable tactile sensation at 18 dB re 1 V level or 16 Vpp. On the other hand, at 180 Hz the voltage threshold level is half of that, requiring significantly less power (12 dB re 1 V peak or 8 Vpp). Therefore, tactile feedback can be optimized to require less power, which can be especially important for mobile devices.

The frequency and amplitude discrimination thresholds describe the resolution of human perception: they determine the granularity of tactile sensations that can be used in designing interfaces. For example, if designers want to create two distinct tactile sensations, then they would make sure that the amplitude of voltages for each sensation are at least a certain voltage different apart from one another for the user to be able to differentiate them. Similar considerations also apply for frequency of stimuli.

Figure 7:
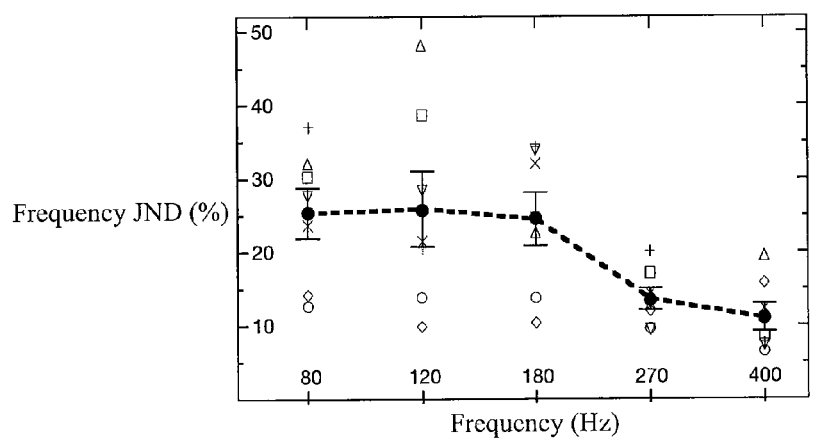
FIG. 7 illustrates frequency just-noticeable-differences (JNDs) based on a user survey, according to one embodiment of the invention.

FIG. 7 illustrates frequency just-noticeable-differences (JNDs) based on a user survey, according to one embodiment of the invention. Five subjects were subjected to a test at five different frequency levels. The results for each subject are shown in FIG. 7 with a different symbol corresponding to each subject. Also shown are the average values with standard error bars. It should be understood that the results shown in FIG. 7 are not meant to be limiting, but rather show one example of frequency discrimination thresholds.

Figure 8:
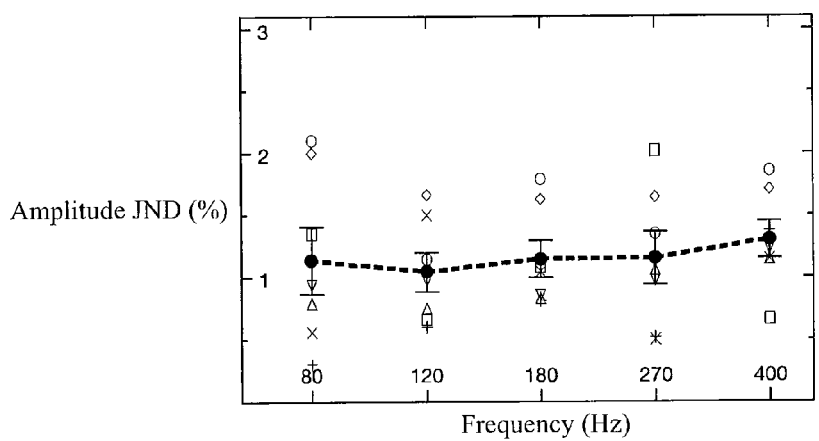
FIG. 8 illustrates amplitude JNDs based on a user survey, according to one embodiment of the invention.

FIG. 8 illustrates amplitude just-noticeable-differences (JNDs) based on a user survey, according to one embodiment of the invention. Five subjects were subjected to a test at five different frequency levels. The results for each subject are shown in FIG. 8 with a different symbol corresponding to each subject. Also shown are the average values with standard error bars. It should be understood that the results shown in FIG. 8 are not meant to be limiting, but rather show one example of amplitude discrimination thresholds.

Figure 9:
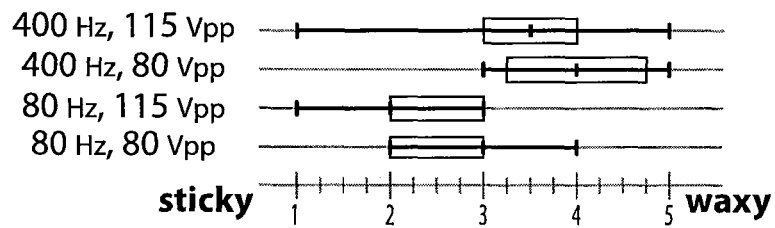
FIG. 9 illustrates the results of a user survey of four textures produced by four frequency-amplitude combinations, according to one embodiment of the invention.
Figure 9:
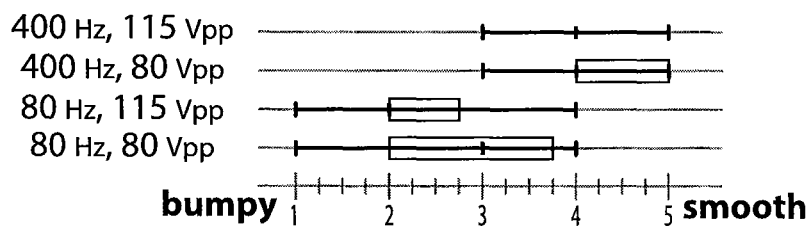
Figure 9:
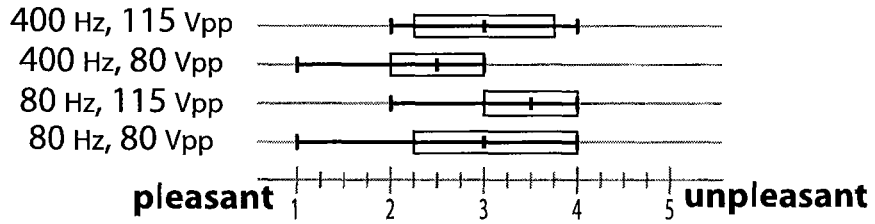
Figure 9:
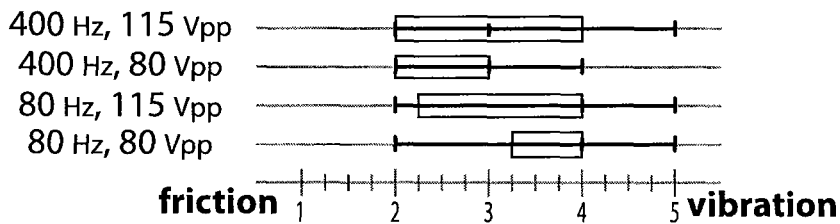

As described, the sensations felt by individual users can vary from person to person. FIG. 9 illustrates the results of a user survey of four textures produced by four frequency-amplitude combinations, according to one embodiment of the invention. As shown, users were subjected to four combinations of frequency and amplitude, including 80 Hz-80 Vpp (voltage peak-to-peak), 80 Hz-115 Vpp, 400 Hz-80 Vpp, and 400 Hz-115 Vpp.

Low frequency stimuli were perceived as rougher compared to high frequencies. They were often likened to "wood" and "bumpy leather," versus "paper" and "a painted wall" for higher frequency stimuli.

The effect of amplitude depends on stimuli frequency. For high frequency textures (e.g., 400 Hz) an increase of amplitude increased perceived smoothness of tactile sensations. Similarly, at 80 Vpp textures were mostly compared to "cement surface" and "cheap paper," and at 115 Vpp they were compared to "paper" or "a painted wall." Some participants explicitly pointed out this increase in perceived smoothness.

At low frequencies (e.g., 80 Hz), an increase in stimuli amplitude heightens the perception of stickiness. While some participants referred explicitly to a "sticky" sensation, others compared the sensation to that of touching a "motorcycle handle" or "rubber." Other participants associated viscosity with this type of texture. One participant compared his experience to "running fingers through viscous liquid."

Again, it should be understood that the results shown in FIG. 9 are not meant to be limiting, but rather show one example of amplitude discrimination thresholds.

Exemplary Use Cases and Implementations of Electrovibration Actuation

As described above, embodiments of the invention can be implemented in a wide variety of use cases and applications. Some of these use cases and applications are outlined below. The examples provided below are merely exemplary and are not meant to limit the scope of embodiments of the invention.

One implementation of the electrovibration techniques described herein includes simulation applications. This class of applications includes such tactile effects as textures for virtual objects, simulation of friction between objects or objects and a virtual surface, and/or activities like painting and drawing, where tools are manipulated on top of a canvas.

In addition, tactile feedback on touch screens allows for non-visual information layers. For example, a visual image of a star field could be supplemented with a "tactile image" of radiation intensity felt by fingers running over the areas of interest. The tactile channel can be dynamic in both amplitude and frequency, potentially offering two additional channels of information.

Another example includes incorporating tactile feedback with conventional GUI (graphical user interface) elements. For example, a slider in GUI window can report their drag extent by changing the tactile feedback frequency. Similarly, a user could run his or her fingers over a list of emails to sense those that are new or with the highest priority. There are numerous other interaction design ideas that can be implemented using embodiments of the invention.

According to various embodiments, changing the frequency of the input signal can be modified by modulating the input signal with a different Pulse-Amplitude-Modulated waveform.

In yet another example, direct manipulation is ripe for tactile augmentation, especially in touch interfaces where occlusion can be problematic. Files, icons, and other "dragable" items could be augmented with variable levels of friction to not only confirm that the target was successfully captured, but also convey properties like file size and drag-and-drop applicability. For example, larger files may be associated with greater friction than smaller files. Object alignment, snapping, and grid-based layouts could be also supplemented with tactile feedback. Such tactile augmentation could enable eyes-free interaction with sufficient practice.

Repeated cursor motion over a region, i.e. rubbing, has been used in image editing applications for erasing, smoothing, desaturating, and other procedures that incrementally increase or decrease some attribute of the image. Rubbing interaction offers an interesting application of dynamic tactile feedback. For example, as a user progressively wipes out pixels in an area of an image, the tactile sensation could decrease.

In some embodiments, fingers in motion could be stimulated, while static fingers would not receive any tactile stimulation. Therefore, embodiments of the invention allow for multi-touch tactile feedback so long as at each moment only one finger is moving on the surface. There are at least two examples where this can be employed in a unique and useful manner. One implementation includes gestures where one finger defines a reference point, while another finger is used for manipulation. A selection from a pie menu is one example, where one finger is static while another moves rotationally to select an item. Similarly, shape transformations can be implemented, where one finger defines a static reference point while a moving finger specifies the amount of transformation, e.g. stretching, rotation, or zooming. In all such operations, a moving finger can be easily supplemented with tactile feedback using embodiments of the invention.

Still further examples include gestures that employ asymmetric separation of labor between the two hands. For example, a non-dominant hand could perform a gross manipulation, such as orienting a sheet of paper, while the dominant hand performs a fine-grained interaction, such as writing. Another implementation could use one or more modal buttons to define operation of a common slider. As in the previous example, one or more fingers are static, while one or more are engaged in movement and provided with tactile feedback using embodiments of the invention.

In yet another embodiment, embodiments of the invention can be implemented in a multi-touch surface having multiple electrodes addressed individually. The tactile display could include one or more individually addressable and individually controlled transparent electrode plates, each of which is covered with the thin insulating layer. The electrodes can provide independent tactile feedback when a finger slides on them. Each electrode can be addressed independently from other surrounding electrodes. Accordingly, different sensations can be created for different fingers.

Figure 10A:
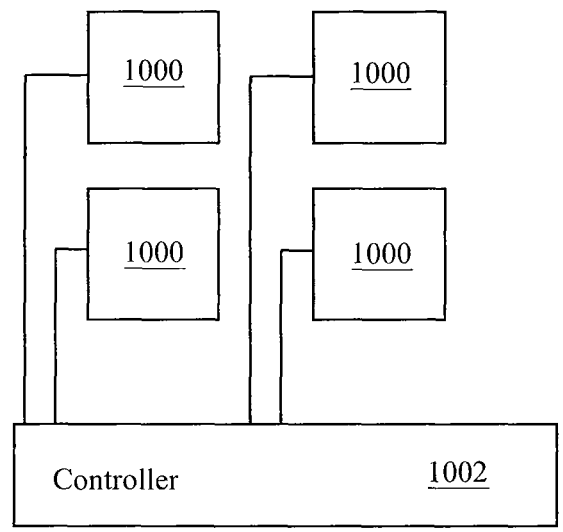
FIG. 10A is a conceptual diagram illustrating multiple electrodes each controlled by a separate wire, according to one embodiment of the invention.

In one embodiment, each of the multiple electrodes is controlled by an independent wire. FIG. 10A is a conceptual diagram illustrating multiple electrodes 1000 each controlled by a separate wire, according to one embodiment of the invention. A controller 1002 is coupled by a separate wire to each electrode. Each of the multiple electrodes 1000 receives a separate input signal. The advantage of using independent wires for each electrode is that implementing multiple wires is relatively easy, but a disadvantage is that using many wires may not scalable as the number of electrodes increases.

In one embodiment, a driver can sweep over all connections to create a dynamic high frequency AC signal. In other words the driver turns each of the electrodes on for a very short time, then turns it off, goes to the next electrode, turns on and off and so on. If driver is switching very fast, the resulted signal on each pattern can be a Pulse-Amplitude-Modulated (PAM) wave, or a derivative of a PAM. In another embodiment, embodiments can create an equivalent number of signal sources as electrodes and then connect each signal source to one electrode. This embodiment may be particularly advantageous in embodiments that include a relatively small number of electrodes.

Figure 10B:
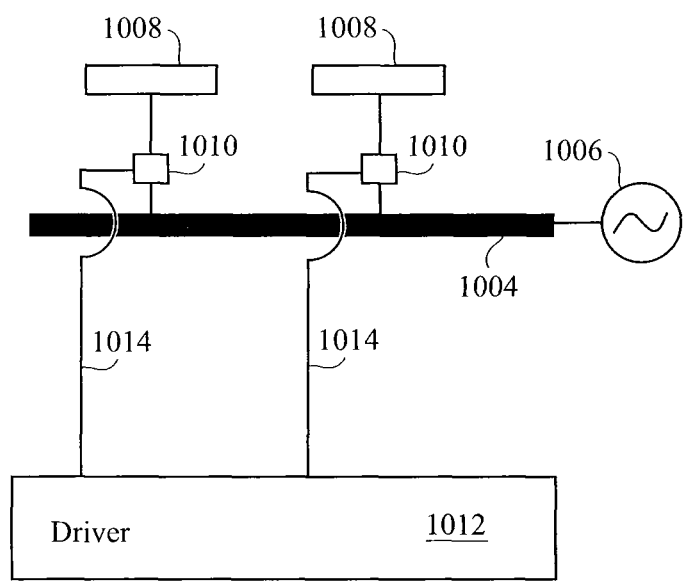
FIG. 10B is a conceptual diagram that illustrates controlling multiple electrodes with switches, according to one embodiment of the invention.

In yet another embodiment, one or more conductive pathways or layers of conductive material can be used to control the independent electrodes. FIG. 10B is a conceptual diagram that illustrates controlling multiple electrodes with switches, according to one embodiment of the invention. As shown, an underlying electrode 1004 is provided with an input signal 1006. Small electronically-controlled switches 1010 can be used to bridge top patches 1008 that are touched by the users and the underlying electrode 1004. Control paths 1014 can be used to connect and disconnect the top patches 1008 from the signal electrode 1004 with a driver 1012. In other embodiments, the multiple electrodes can be controlled with a switching circuit coupled to each of the electrodes.

The electronically-controlled switches 1010 can comprise transistors, diodes, relays, or other components, such as flexible electronics materials and/or organic electronics. The switches 1010 can be controlled by a grid of wires for addressing. In one implementation, a single wire may be provided per row of patches 1008, and single wire per column of the array of patches.

In yet another embodiment (not shown), the driving electrodes and electrodes that are touched are separated and connected via capacitive coupling. Each electrode is driven through capacitive coupling from one patterned layer to another patterned layer. In other words, the top layer has only patterns and that is all. An advantage of this approach is that we can use simple techniques to design control pads and the electrodes no not have to be transparent. In addition, some embodiments would not require wires on the conductive top-most layer. In some embodiments, an LED (light emitting diode) screen can be placed between the driving electrodes and the electrodes that are touched. In other embodiments, a display, a wall, clothes, or other materials can be placed in between the two layers of the electrode.

Various implementations can be used to drive the signal for the electrovibration surface. A conductive layer, such as conductive layer 1004 shown in FIG. 10B, can be powered with a high frequency AC (e.g., 1 MHz) signal, that is switched on and off by the electronically-controlled switches to modulate a lower frequency signal (e.g., 100 Hz) for tactile response for a particular tile 1008. Doing so creates a train of bursts where each burst includes high frequency pulses. These stimuli are perceived as low frequency tactile sensations.

Alternatively, embodiments of the invention can modulate the amplitude of the high frequency signal as well, thereby creating a low frequency tactile wave represented as Pulse-Amplitude-Modulated (PAM) signal. Humans would perceive only the low frequency signal and would not feel the high frequency component. Furthermore, in some embodiments, the carrier frequency can be chosen so that the impedance path to ground for the tactile signal frequency is minimal. This could allow for the effect to be perceived without explicit return electrode for the ground.

Figure 11A:
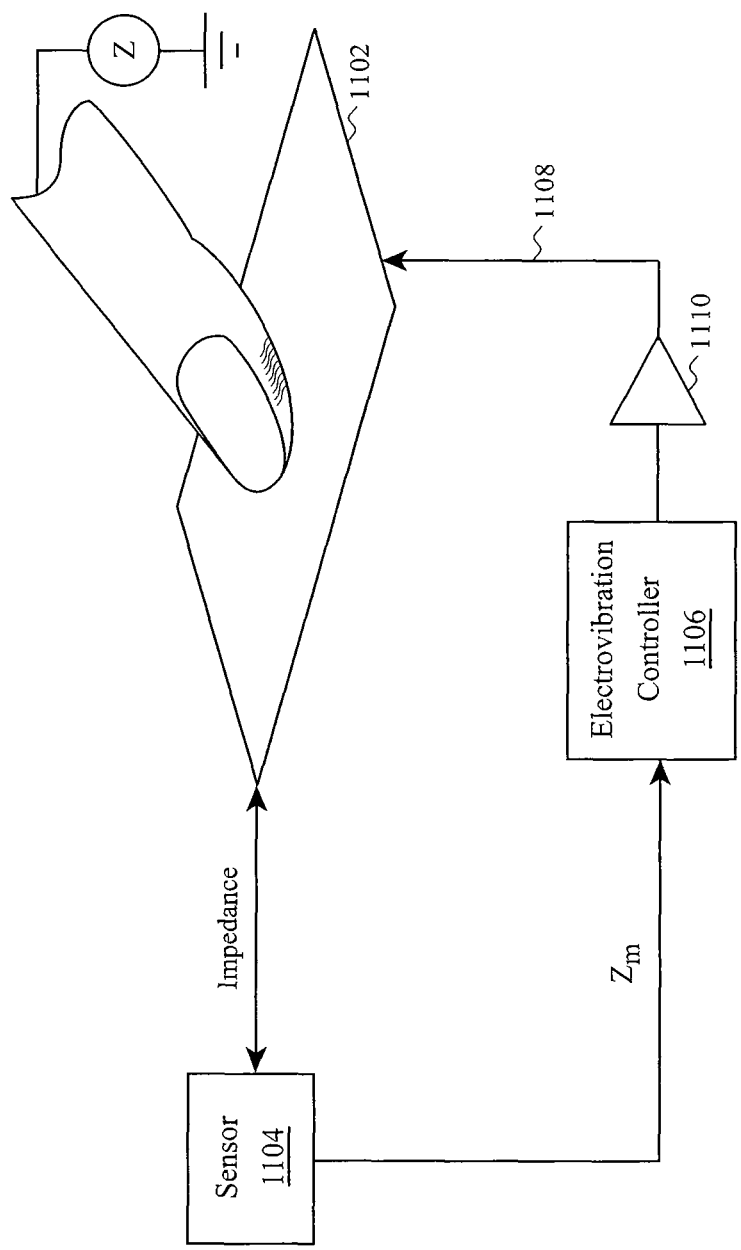
FIG. 11A is a conceptual diagram illustrating implementing an impedance profile, according to embodiments of the invention.

The properties of the actuating signal, such as signal amplitude, signal frequency, signal carrier frequency, DC offset, among others, can be dynamically adjusted depending on the total impedance profile of the system. FIG. 11A is a conceptual diagram illustrating implementing an impedance profile, according to embodiments of the invention. A sensor 1104 can be connected to an electrode 1102, and measure the overall impedance profile $Z_m$ for the finger touching the touch panel. According to some embodiments, the impedance can be dependent on a variety of factors, including the resistance of the circuit, both through the user's body and through electronic components, the moisture of the digit in contact with the surface, the amount of contact surface between the digit and the device, among others. Various techniques can be used the measure the impedance profile. In one embodiment, a sweep of the frequencies is performed and then the response is measured.

In some embodiments, the tactile perception felt by the user is based on the impedance value. In one embodiment, the potential difference between the user and ground can cause the actuation to be perceived differently. For example, the sensation that a user feels could be different when standing on a metal bridge and interacting with the device versus standing on a wooden floor and interacting with the device. Also, in some embodiments, the impedance can vary in time during the interaction with the touch surface. For example, a user can walk up a flight of stairs while interacting with the device, which would change the user's potential difference to ground.

The measured impedance profile measured by the sensor 1104 is transmitted to a controller 1106 that provides an actuation signal 1108 to the electrode 1102. According to some embodiments, the parameters of the signal 1108 are based on the measured impedance $Z_m$ so that tactile perception of the electrovibration is maintained. In some embodiments, the signal amplitude and/or DC offset can be adjusted so that the potential difference of the user to ground is maintained the tactile feedback is perceived similarly. In some embodiments, the impedance value is used to control a carrier frequency of a PAM modulation or other modulation of the signal and/or adjust a value of a DC component of the signal. Thus, for example, as a user interacting with the device walks over a metal bridge and up a flight of wooden stairs, the signal that is output from the controller is adjusted so that the perceived tactile feedback remains similar during the entire interaction. Without dynamically controlling the signal, as described herein, the strength of feedback would change as the user's potential difference to ground changes, which could be jarring to the user.

Although FIG. 11A shows the signal output from the controller being applied to the electrode 1102, another embodiment of the invention provides for a grounded electrode and the signal being applied to the user (i.e., through the back side of the device). Also, the controller 1106 can be implemented as hardware, software, or a combination of hardware and software.

In addition, an amplifier 1110 is included in the path from the controller 1106 to the electrode 1102 or finger. In one embodiment, the amplifier is a transistor-based amplifier. According to some embodiments, the amplifier 1110 can be included within the controller 1106 or separately from the controller. In some embodiments, gain of the amplifier can be adjusted to dynamically control the signal that is output from the controller. Also, using a transistor-based amplifier allows for a DC offset to be included in the output signal. In prior art techniques, a transformer amplifier was used. However, a transformer-based amplifier can only drive an AC (alternating current) signal and cannot pass a DC offset. Additionally, with smaller device such as hand-held devices, transformer amplifiers may be too large. Accordingly, a transistor-based amplifier is smaller and can easily fit within the housing of a hand-held device.

In some embodiments, the tactile signal can be modulated using the PAM modulation techniques described herein, and then a high frequency (i.e., carrier) signal can be used to encode information that is used for other purposes. Examples include creating a sound, watermarking tactile sensations, sending information to objects touching the surface, e.g. device placed on the surface, sending information to a device worn by the user, and/or sending power to the devices placed on the table.

In some embodiments, a DC (direct current) offset is added to the periodic signal. Adding a DC offset to a signal can increase the perceived strength of the signal and allows for stronger sensations. In some embodiments, the control electronics that control the DC offset are independent of the control electronics that control the variability of tactile signal, allowing embodiments to optimize the tactile perception.

In other embodiment, only positive or only negative periodic signal is provided.

Figure 11B:
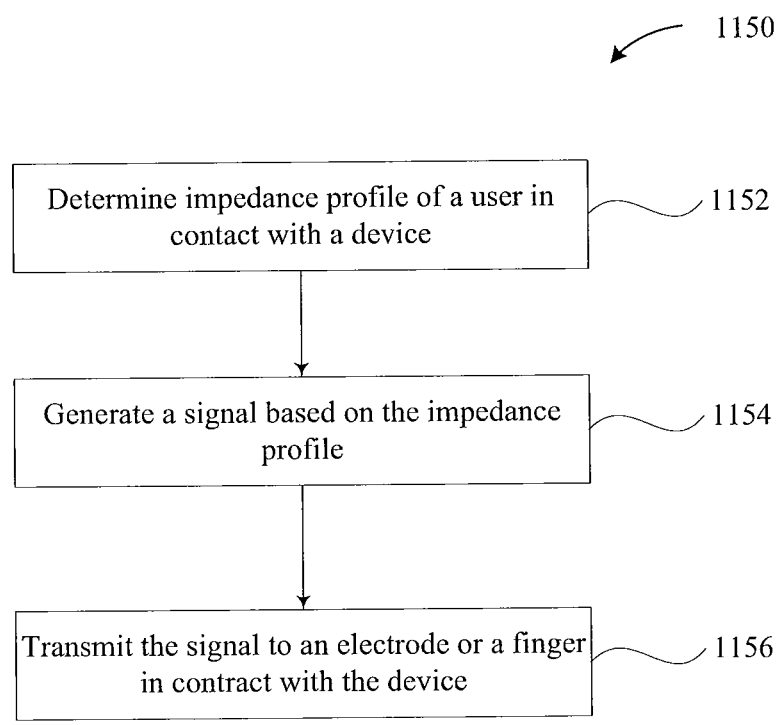
FIG. 11B is flow diagram for providing electrovibration actuation based on an impedance profile, according to one embodiment of the invention.

FIG. 11B is flow diagram for providing electrovibration actuation based on an impedance profile, according to one embodiment of the invention. Persons skilled in the art would understand that, even though the method 1150 is described in conjunction with the systems of FIGS. 1-11A, any system configured to perform the method steps, in any order, is within the scope of embodiments of the invention.

As shown, the method 1150 begins at step 1152, where a sensor determines an impedance profile of user touching a device. According to some embodiments, the impedance can be dependent on a variety of factors, including the resistance of the circuit, both through the user's body and through electronic components, the moisture of the digit in contact with the surface, the amount of contact surface between the digit and the device, among others. Various techniques can be used the measure the impedance profile. In one embodiment, a sweep of the frequencies is performed and then the response is measured.

At step 1154, a controller generates a signal based on the impedance profile. As described, the parameters of the signal can be modified so that the perceived haptic feedback remains similar throughout the user interaction with the device. In some embodiments, the signal amplitude and/or DC offset can be adjusted so that the potential difference of the user to ground is maintained so that the tactile feedback is perceived similarly.

At step 1156, the controller transmits the signal to the electrode or to the finger in contact with the device. In one embodiment, as shown in the FIG. 2A, the signal can be transmitted to the electrode. In another embodiment, as shown in the FIG. 2B, the signal can be transmitted to the finger via coupling the signal to the back side of the device and having the signal pass through the user's body to the finger in contact with the device. Additionally, in some embodiments, the signal passes through a transistor-based amplifier before arriving at the electrode or the finger in contact with the device.

Figure 12:
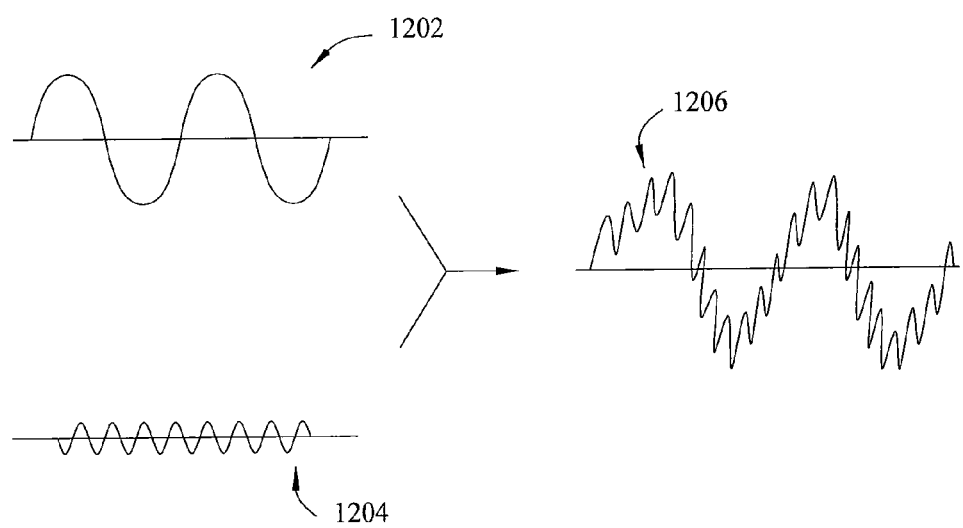
FIG. 12 is a conceptual diagram that illustrates combining a low frequency signal and high frequency signal, according to one embodiment of the invention.

In other embodiments, a low frequency signal is combined with higher frequency signal creating a combined signal that is perceived as a single sensation. FIG. 12 is a conceptual diagram that illustrates combining a low frequency signal and high frequency signal, according to one embodiment of the invention. As shown, a low frequency signal 1202 is combined with a high frequency signal 1204 to produce a combined signal 1206. A human could perceive both the low frequency and the high frequency components of the combined signal 1206 independently, in certain embodiments. The control techniques could control both signal frequencies independently, and different information can be represented using different frequencies embedded into the same combined signal 1206.

In embodiments that include multiple individually controlled electrodes, the electrodes can be arranged in a pattern. The electrode patterns can have various shapes, sizes and arrangements. For example, the electrode pattern can includes electrodes shaped as squares, triangles, hexagons, circles, or any other shape. For example, in some embodiments, the electrode patterns may allow the user to feel the edge of a bush putton.

In some embodiments the electrode is transparent. In other embodiments, the electrode is opaque or translucent.

Further, embodiments of the invention can be combined with other actuation technologies. In one embodiment, electrovibration actuation can be combined with mechanical vibrotactile actuation to provide a wider range of sensations. In another embodiment, electrovibration actuation can be combined with an ultrasonic horizontal actuator. Ultrasonic motion can be provided below the perception level, i.e., the ultrasonic motion moves the plate instead of the finger. Accordingly, the surface would be sliding finger in relation to the finger while the user is sensing the electrovibration. Such an implementation would allow the user to feel tactile feedback when the finger is not moving, i.e., to feel button presses. In yet another embodiment, electrovibration actuation can be combined with capabilities in temperature changes. In one example, a marble surface could feel cold and a wood surface could feel warm.

Conventional surface capacitive input sensing includes interpreting the voltage and/or current drops on corners of the touch panel when a user is touching the surface. This conventional voltage and/or current drop is interpreted relatively to a reference signal that is a low voltage, AC signal of constant amplitude and frequency injected into the electrode of the capacitive touch panel. In some embodiments of the invention, a high voltage, arbitrarily-shaped signal is injected in the electrode of the capacitive touch panel to provide tactile sensation. The signal can then be used as a reference voltage for capacitive sensing. The voltage and/or current drop on the corners of the panel are interpreted relative to the arbitrary, high voltage signal injected into the electrode in order to compute touch coordinates.

In some embodiments, the reference signal and the signal according to embodiments of the invention can be injected alternatively using a high frequency switching mechanism. The switching frequency can be beyond the sensitivity threshold. Thus, rapidly alternating input sensing and haptic feedback signal can be perceived as parallel mechanisms from the user's perspective.

In yet another embodiment, other objects placed on or near the electrovibration surface can provide electrovibration tactile feedback. In one embodiment, the objects are capacitively coupled to the electrovibration surface and, therefore, can provide tactile feedback. For example, a toy placed on the electrovibration surface can be coated with an insulating film. The electrovibration haptic effect can be sensed by a user that touches the object.

In some embodiments, the conductive surface can be a wire, on which fingers slide up and down. For example, the wire can be created as a combination of resistive and conductive threads. In other embodiments, actuation can be done through a graphite or lead pencil on paper. For example, an electrode can be placed underneath the paper provides voltage and the pen would feel differently in the user's hands, e.g. this is tactile sensation between pen and user. In yet another embodiment, the conductive layer can be conductive paint, and the insulation layer can be non-conductive paint.

In some embodiments, electrovibration tactile feedback can be used to supplement the display of real-world objects. Embodiments of the invention can be overlaid on top of an image of an object or an actual 3D object. When the user touches the screen, the user can "feel" the image of the object or an actual 3D physical object. To accomplish this sensation, embodiments of the invention receive a digital representation of the image, that can be either 2D or 3D, convert the digital representation into a tactile representation, and then overlay the tactile representation over the digital representation. To correctly determine which part of the object the user intends to touch, at least one camera or other sensor can be used to track user viewpoint direction and correlate it with finger position on top of the touch sensitive surface. In one embodiment, the user can feel the image of the object where the picture is stored on a computing device, and in other embodiments, the user can feel the image of the object where the picture is received over a network, such as the Internet. In some embodiments, the object comprises a key on a keypad or a text entry interface.

In some embodiment, the signal coupled to the electrode is based on a controller detecting that a first digit is placed in contact with the insulation surface and that a second digit is placed in contact with the insulation surface, where the first digit is stationary and the second digit is sliding along the insulation surface. In some embodiments, the system recognizes multiple touch points and different tactile feedback is provided when different touch points are moved asynchronously. For example, left and right hands could be placed on the touch panel. When the left hand is moving (while right hand is kept static) signal A is provided. When right hand is moving (while left hand is kept static) signal B is provide. When both hands are moving, no signal or signal C is provided.

In another embodiment, a camera can be used in conjunction with the electrovibration techniques described herein. A user holds a camera, e.g., a camera included in a mobile device, and points the camera at an object. Software associated with the camera can detect the object that is being captured and cause a corresponding tactile feedback to be sensed when the user touches the screen.

In yet another embodiment, an object can be placed inside a protective case that covers the object. For example, in a museum setting, articles in the museum can be placed behind a glass case, e.g., artifacts, paintings, animals. The protective case can be implemented with embodiments of the invention. Thus, when a user touches the protective case, the user can feel electrovibration actuation that can correspond to the feel of the object within the protective case. In some embodiments, additional tracking techniques could be used to understand which part of the tactile map should be presented to the user. The tracking techniques could utilize gaze or face tracking techniques, as well as other techniques.

Some embodiments of the invention could allow for collaboration applications, where different sensations are provided to different users. Other embodiments may provide an application where erasing and/or sketching can be done using a finger with variable friction. Similarly, embodiments allow for tactile feedback for rubbing-based interaction. Other embodiments include tactile scroll wheels, GUI items are augmented with tactile feedback provided by the scroll wheel of a mouse.

Yet another example of application of embodiments of the invention is augmenting a text entry technique with tactile sensations. For example, input keys can be displayed on a display screen, such that when a user touches the keys, the user feels a tactile feedback, e.g., while touch-typing or during a "swype"-style text or password input.

In yet another embodiment, amusement park rides can be augmented with electrovibration technology according to embodiments of the invention. For example, a slide that a person slides down can provide electrovibration feedback.

Embodiments of the invention offer several significant advantages over conventional mechanical vibrotactile actuation on touch screens. The absence of mechanical motion in electrovibration actuation techniques is the most immediate difference between embodiments of the invention and conventional mechanical actuation. This feature has several notable implications.

Regardless of the type of material, any plane of material will flex when actuated. This problem is exacerbated when the plate is large and actuation forces are applied on its periphery, which is common when designing tactile feedback for touch surfaces. Consequently, not only are vibrotactile solutions not feasible for large interactive surfaces, but even for small screen sizes, different parts of the screens would have different magnitudes of physical displacement and, therefore, different tactile sensations. Electrovibration, on the other hand, does not suffer from this effect as electrical potential is evenly and instantaneously distributed over the entire plate. The tactile feedback in embodiments of the invention is uniform across surfaces of any size.

When a periodic force vibrates a plate of material, as is the case for vibrotactile displays, the plate spring properties are combined with dampening, which is inherent due to attachment of the plate to an enclosure or chassis, and together they result in a highly attenuated frequency response of the plate. As a result, for a signal of the same amplitude, the mechanical displacement of the plate will be different at different frequencies, peaking close to its resonant mechanical frequency and then dramatically decreasing. These complex signal attenuations make it essentially impossible to engineer a flat response—even software amplitude correction cannot hope to counter these laws of physics. Because electrovibration requires no moving parts, it suffers from neither of these effects.

Byproduct noise is a serious consideration when designing end-user interactive systems. For example, most people accept that their kitchen blenders are noisy, but people use them rarely and then only briefly, so the noise level is tolerated. This level of noise would not be acceptable in a computing device we hope to use for extended period of time. Unfortunately, physical vibrations are often noisy, e.g., consider a mobile phone vibrating on a table. Compounding this problem is the fact that interactive surfaces tend to have large surface areas, which displace a considerable volume of air, essentially turning their screens into speakers. Because there is no physical motion in embodiments of the invention, the electrovibration surface is silent.

Moving parts naturally wear over time, which alters their performance characteristics and may eventually lead to failure. In addition, the vibrating screen must be separated from the enclosure with a small seam to accommodate movement, which allows dust, liquid and other debris inside the device. Sealing this seam, however, dampens vibrations, which decreases the intensity of tactile feedback. None of these issues are relevant in embodiments of the invention. In addition, embodiments of the invention can be practiced without requiring a high-voltage signal. In some examples, tactile sensations can be perceived with as little as 8 Volts peak-to-peak.

As described, vibrotactile actuation delivers tactile feedback by displacing the entire surface. As a result, all fingers resting on the surface will be stimulated and any physical object located on the surface is likely to chatter and move around, which is less favorable. In general, there is no way to localize tactile feedback to particular digits when vibrotactile feedback is used with interactive surfaces.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments have been described herein, it is to be understood that the embodiments are not limited to those precise embodiments, and that various other changes and modifications may be affected therein by one skilled in the art without departing from the scope or spirit of the disclosure.

What is claimed is:

1. A method for generating a signal, the method comprising:
    detecting a varying impedance value of a user in contact with a device relative to a ground;
    adjusting the signal based on the varying impedance value; and
    causing the signal to be coupled to the user such that, as the signal is adjusted, the signal is adapted to generate substantially the same tactile sensation in at least one digit that slides on an insulation surface of the device.

2. The method of claim 1, wherein the device includes a conductive surface coupled to a path to the ground.

3. The method of claim 2, wherein the insulation surface is disposed on the conductive surface.

4. The method of claim 1, wherein coupling the signal to the user comprises providing the signal directly to a back surface of the device or coupling the signal to the back surface via capacitive, resistive, and/or inductive elements.

5. The method of claim 1, wherein the varying impedance value is based on at least one of a moisture of the digit and an amount of surface contact between the digit and the insulation surface.

6. The method of claim 1, further comprising:
    in response to detecting a change in the varying impedance value, modifying at least one property of the signal that is coupled to the user.

7. The method of claim 6, wherein the at least one property of the signal is modified in a manner to generate substantially the same tactile sensation.

8. The method of claim 6, wherein modifying the at least one property of the signal comprises modifying an amplitude and/or DC (direct current) offset of the signal.

9. The method of claim 1, wherein the at least one digit comprises a finger or a conductive object.

10. The method of claim 1, wherein the signal is time-varied and/or periodic.

11. The method of claim 10, wherein the signal is modulated.

12. The method of claim 11, wherein the signal is modulated using Pulse Amplitude Modulation (PAM) or a derivative of PAM.

13. The method of claim 10, wherein the signal comprises a sinusoidal waveform, a square waveform, or a triangular waveform.

14. The method of claim 10, wherein the signal comprises an alternating current (AC) signal.

15. The method of claim 10, wherein the signal includes a direct current (DC) offset.

16. The method of claim 10, wherein the signal is generated by combining a low frequency signal and a high frequency signal.

17. An apparatus for generating a signal, the apparatus comprising:
    an insulation surface;
    a sensor configured to detect a varying impedance value of a user in contact with the apparatus relative to a ground; and
    a controller configured to:
        adjust the signal based on the varying impedance value, and
        cause the signal to be coupled to the user such that, as the signal is adjusted, the signal is adapted to generate substantially the same tactile sensation in at least one digit that slides on the insulation surface.

18. The apparatus of claim 17, wherein the apparatus comprises an interactive table or a hand-held mobile device.

19. The apparatus of claim 17, further comprising a display screen that displays a graphical user interface, wherein the same tactile sensation that is perceived in the at least one digit is associated with an object displayed in the graphical user interface.

20. The apparatus of claim 19, wherein the object comprises a key on a keypad or a text entry interface.

21. The apparatus of claim 17, further comprising a display screen that displays an image associated with a painted surface, so that as the at least one digit slides on the insulation surface, the painted surface changes and a different tactile sensation is provided.

22. The apparatus of claim 17, wherein the signal is based on the controller detecting that a first digit is placed in contact with the insulation surface and that a second digit is placed in contact with the insulation surface, wherein the first digit is stationary and the second digit is sliding along the insulation surface.

23. The apparatus of claim 17, wherein, in response to a change in the varying impedance value, the controller modifies at least one property of the signal that is coupled to the user.

24. The apparatus of claim 23, wherein modifying the at least one property of the signal comprises modifying an amplitude and/or DC (direct current) offset of the signal.

25. The apparatus of claim 23, further comprising a transistor-based amplifier configured to amplify the signal before the signal is coupled to the user, wherein modifying the signal comprises modifying a gain of the amplifier.

26. The apparatus of claim 25, wherein the amplifier is configured to maintain a DC (direct current) offset of the signal.

27. An apparatus for generating an AC (alternating current) signal, the apparatus comprising:

an insulation surface;
a sensor configured to detect an impedance value of a user in contact with the apparatus relative to a ground; and
a controller configured to:
generate the AC signal based on the impedance value,
wherein the AC signal includes a DC (direct current) offset, and
cause the AC signal to be coupled to the user such that the signal is adapted to generate a tactile sensation in at least one digit that slides on the insulation surface, wherein the AC signal passes through an amplifier that maintains the DC offset of the AC signal,
wherein the controller is configured to, in response to detecting a change in the impedance value, modify the AC signal that is coupled to the user such the signal is adapted to generate substantially the same tactile sensation as the impedance value changes.

* * * * *